United States Patent [19]

Bader

[11] Patent Number: 5,265,946

[45] Date of Patent: Nov. 30, 1993

[54] PROCESS FOR DETERMINING THE WHEEL SLIP OF INDIVIDUAL WHEELS OF A VEHICLE

[75] Inventor: Christian Bader, Boeblingen, Fed. Rep. of Germany

[73] Assignee: Daimler-Benz AG, Fed. Rep. of Germany

[21] Appl. No.: 508,690

[22] Filed: Apr. 13, 1990

[30] Foreign Application Priority Data

Apr. 17, 1989 [DE] Fed. Rep. of Germany ....... 3912555

[51] Int. Cl.⁵ ............................ B60T 8/32; G01P 3/00
[52] U.S. Cl. ................................ 303/96; 303/DIG. 3; 303/100
[58] Field of Search ................... 303/100, 113, 92, 97, 303/96, 105, 106, DIG. 3, DIG. 4, 113 R, 113.1

[56] References Cited

U.S. PATENT DOCUMENTS

| | | | |
|---|---|---|---|
| 3,614,173 | 10/1971 | Branson | 188/181 C |
| 3,832,008 | 8/1974 | Leiber et al. | 303/96 |
| 3,912,034 | 10/1975 | Pallof | 303/96 X |
| 4,313,166 | 1/1982 | Rode et al. | 303/105 |
| 4,729,608 | 3/1988 | Fennel et al. | 303/109 |
| 4,855,917 | 8/1989 | Sawano et al. | 303/97 |
| 4,965,729 | 10/1990 | Hapner et al. | 303/100 |
| 4,971,174 | 11/1990 | Abe et al. | 303/92 X |

FOREIGN PATENT DOCUMENTS

3618691 12/1986 Fed. Rep. of Germany .

*Primary Examiner*—Matthew C. Graham
*Attorney, Agent, or Firm*—Evenson, McKeown, Edwards & Lenahan

[57] ABSTRACT

A process for determining the wheel slip of individual wheels of a vehicle by time sequentially measuring the speeds of a particular wheel without braking force applied and with braking force applied.

27 Claims, 2 Drawing Sheets

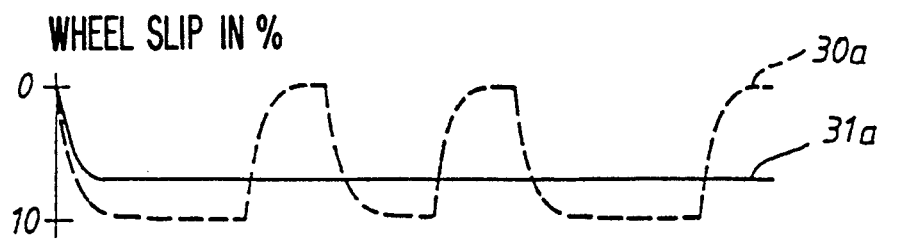
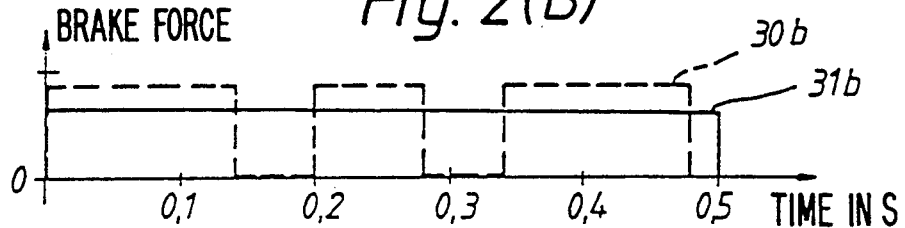
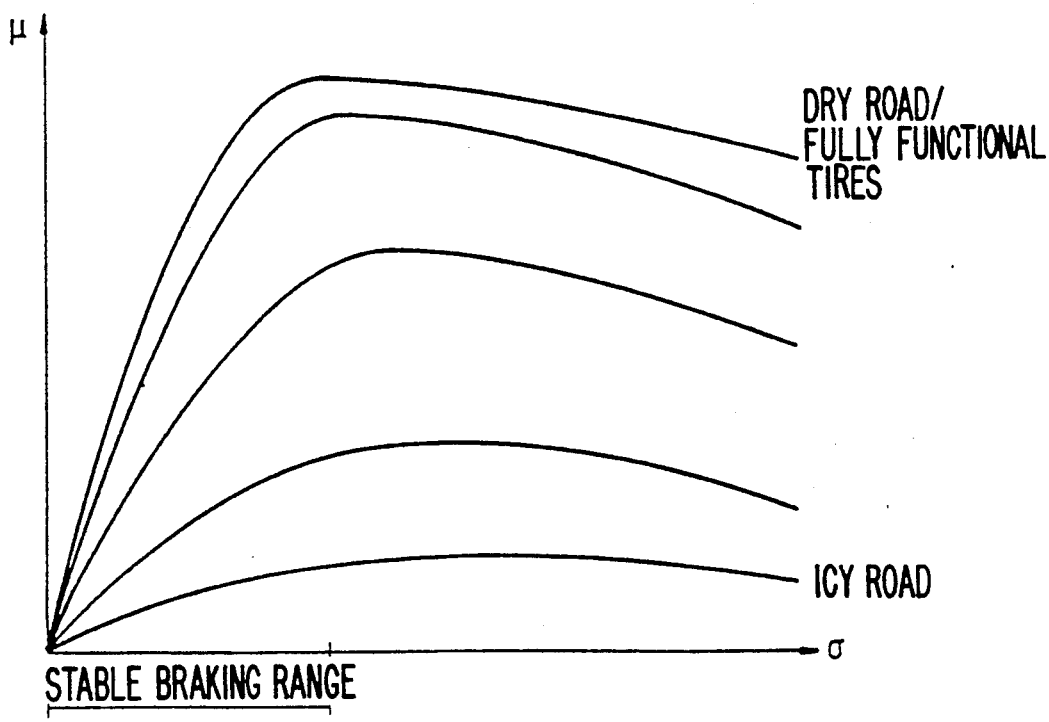

PROCESS FOR DETERMINING THE WHEEL SLIP OF INDIVIDUAL WHEELS OF A VEHICLE

BACKGROUND AND SUMMARY OF THE INVENTION

This invention relates to a process for determining the wheel slip of individual wheels of a vehicle by intermittentently interrupting the application of braking force to each wheel of the vehicle and comparing the speed of each such wheel with braking force applied, to the speed of the same wheel without braking force applied.

A process for determining the slip of a wheel by measuring its speed during braking and comparing it with the speed of a separate reference wheel running unbraked is already known to the art, and is well exemplified by German Patent Document No. DE-2,334,235-B2. In this arrangement, the reference wheel is one of the rear wheels. The braking force on the reference wheel is interrupted cyclically, the time intervals between these interruptions being dependent on vehicle speed and the effective braking force. The slip of each individual wheel of the vehicle is determined by comparing its speed during braking with the speed of the unbraked reference wheel.

However, the use of a separate reference wheel to determine the slip of the individual wheels in this manner introduces several sources of error into the process. In particular, the difference between the radii of the tested wheel and of the reference wheel is neglected. Moreover, additional error arises because the radius of the curvature to be negotiated is generally different for each wheel, causing each wheel to have a different rotational speed when negotiating a curve in the unbraked state. Consequently, in order to accurately determine the slip of the individual wheels by using one wheel as a reference wheel, cornering would have to be taken into account separately.

The object of the present invention is to improve the known process in such a way that the slip $\sigma$ of the individual wheels of a vehicle can be determined precisely within the stable braking range, without the vehicle's assuming an unstable driving state as a result of the determination of the slip during braking.

Additional objects of the invention are:

to provide a process for determining the braking-force coefficients of the individual wheels of a vehicle;

to permit the determination of specific adhesion utilization for different grips of the individual wheels on the road surface;

to establish a specific steering characteristic for cornering during braking; and to provide a process to achieve a uniform wear of brake linings.

Furthermore, by the use of a combination of one or more suitable sensors such as, for example, a sensor for measuring the brake pressure applied to the individual wheels to determine the braking force $F_b$, a deceleration sensor and a sensor for measuring the total weight of a vehicle to determine the braking force $F_B$ and/or a transverse-acceleration sensor, it is thus possible, by precise determination of the wheel slip in the manner set forth and described herein, to obtain a specific driving behavior during braking as a result of a suitable brake-pressure distribution, and/or to diagnose the state of the wheels. The use of further suitable sensors is described in more detail hereafter where appropriate.

In general, the slip $\sigma$ of a wheel is obtained by comparing the speed of the free-running wheel of a vehicle $n_f$ with the speed of a braked wheel $n_b$ according to the following formula:

$$\sigma = \frac{n_f - n_b}{n_f} = 1 - \frac{n_b}{n_f}$$

In the process according to the invention, the slip of the individual wheels is measured precisely during a braking operation in the stable braking range, by intermittent interruption of the brake pressure on each wheel so that such wheel rotates at the speed of a free-running wheel. In one embodiment of the invention, the length of the period of time in which the brake pressure is thus removed from each wheel amounts to approximately 0.1 second, and the speed of each wheel in its free-running state is measured at the end of this period of time. In a second embodiment, an improved process for detecting the state of the free-running wheel is obtained by comparing the rotational acceleration of the wheel with a predetermined threshold value. The state of the free-running wheel is detected when the rotational acceleration of the wheel has fallen below a predetermined threshold value. The braking force is subsequently applied again, and the speed of the braked wheel is again measured when the rotational deceleration of the wheel has fallen below a predetermined threshold value. Wheel slip is then determined by comparison of the speed of the wheel in its free running state and in its braked state.

Since a sufficient amount of measured values must be available in order to provide accurate results during a braking operation, the above process of removing the brake pressure on each wheel is repeated at a time interval of a few tenths of a second. To prevent such periodic temporary interruption of the brake pressure from exciting natural vibrations of the vehicle, the time intervals between the individual interruptions of the brake pressure are varied. Moreover, provision can also be made for reducing the brake pressure simultaneously on all the wheels of an axle, in order to prevent undesirable yawing moments about the vertical axis of the vehicle.

One aspect of the present invention which must be taken into account is that, absent a compensating adjustment in the braking process, the braking distance of the vehicle would be lengthened as a result of the time-dependent interruption of the brake pressure, compared with a vehicle in which no such interruption of the brake pressure is carried out. Thus, in order to ensure that the braking behavior of the vehicle perceptible by the vehicle driver is not affected, and in particular to ensure that possible overreactions of the vehicle driver will be prevented, provision is made for determining a desired value for the intensity of the braking operation from the position of the brake-value transmitter of the brake system, and for achieving an overall braking force consistent with the desired value. Where appropriate, the determination of the desired value includes the vehicle speed as an additional parameter. That is, when the brake pressure is intermittentently interrupted by the control device during a braking operation, then, on the basis of the desired value determined, the brake pressure, when reapplied, is brought to a higher value than that corresponding to the value of the brake pressure when there is no time-dependent interruption of the brake pressure. The higher brake-pressure value is selected such that the time average of the braking force becomes equal to the time average of the braking force obtained when the brake pressure is continuously applied.

On a vehicle without an anti-lock system (ABS), the stable braking range is detected by the vehicle driver's predetermining a low desired value for the intensity of the braking operation. If there is nevertheless a locking of the wheels because of a low $\mu$-value, the intermittent interruption of the braking force is not adversely affected since the braking force is thereby interrupted in such a way that the wheels of the vehicle start to run again; that is to say come nearer to the stable braking range. Moreover, the stable braking range can be detected from the fact that the wheel deceleration remains below an appropriately predetermined threshold value. To have a sufficient reserve in terms of the stability of the braking operation, this threshold value of the wheel deceleration is preferably selected so that it is below the response threshold of an ABS possibly present.

On a vehicle with ABS, the leaving of the range of the stable braking operation can additionally be detected by the presence of activating signals from the ABS to the pressure-reducing components of the brake system. In principle, a combination of these criteria is also possible for the purpose of detecting the leaving of the stable braking range. When the leaving of the stable braking range has been detected, no further output signals are transmitted by the control device.

Because the basic functional relationship between the braking force coefficient $\mu$ of a wheel relative to the road surface and the slip of such wheel $\sigma$ is known, the precisely determined wheel slip of the individual wheels of a vehicle determined in accordance with the invention can also be used to determine a breaking force coefficient for each wheel, thereby permitting detection of differences in the adhesion of each wheel to the road surface, and adjustment or compensation therefor.

The braking force coefficient $\mu$ can be determined separately for each wheel when the contribution $F_b$ of each wheel to the total effective braking force $F_B$ and also the gravitational force $N_g$ acting on this wheel is known. The braking force coefficient $\mu$ is derived as follows:

$$\mu = \frac{F_b}{N_g}$$

The basic trend of the $\mu/\sigma$-characteristic is known. This characteristic varies, on the one hand, with the conditions on the road surface, such as, for example, black ice, road wet from rain or dry road, and, on the other hand, with the properties of the wheel, such as, for example, wear, air pressure in the tire and the properties of the tire material. For this reason, a family of characteristics for the braking force coefficient $\mu$ against the wheel slip $\sigma$ is therefore obtained. The parameter for this variation in the characteristic is referred to below as the grip of the wheel with the road surface. Now since the braking force coefficient $\mu$ and the wheel slip $\sigma$ are determined individually for each wheel, it is possible for the basic grip of the wheel with the road surface to be determined individually for each wheel from the family of characteristics.

The contribution $F_b$ of an individual wheel to the total effective braking force $F_B$ can be determined by ascertaining the force which is exerted on this wheel by the brake system. This can be accomplished by direct measurement of the force on the brake caliper or by measuring the pressure on the wheel-brake cylinder, which is proportional to the braking force $F_b$ in close approximation. Furthermore, the total effective braking force $F_B$ can be determined from the total mass M of the vehicle and from the deceleration during the braking operation according to the formula:

$$F_B = M \cdot a$$

A determination of the braking force $F_b$ which is less exact under specific driving conditions may also be obtained if it is assumed that the vehicle is in a stable braking range such that all the wheels of the vehicle make the same contribution $F_b$ to the resultant braking force $F_B$. The quantity $F_b$ is then calculated by dividing the quantity $F_B$ by the number of wheels of the vehicle. In this process for determining the braking force $F_b$, there is no need for sensors which measure this braking force $F_b$ directly, but at the same time this determination of the braking force $F_b$ has the disadvantage of being less accurate than as if the braking force $F_b$ is determined directly by suitable sensors.

If the gravitational force $N_g$ acting on a wheel is known, the braking force coefficient $\mu$ can be determined according to the formula given above. The gravitational force $N_g$ acting on a wheel can be determined, for example, by means of wire strain gauges which are arranged at suitable locations on the axles in a known manner or, on air-suspension vehicles, also by measuring the pressure on the pneumatic spring bellows.

The state of the wheels and/or the nature of the road surface can be found from the determined values of the grip of the individual wheels with the road surface. In a simple form of evaluation, if there are different grip values on the two sides of the vehicle it is concluded that there is a "$\mu$-split" condition. In this case, the grip of the wheels on the respective same side of the vehicle must assume the same value. If it happens that the grip of two or more wheels located on the same side of the vehicle is different, then it must be expected that the wheels will have different properties; that is to say that one of the wheels has a defect. If is it found over a relatively long period of time that the grip of the wheels is different on different sides of the vehicle, from which a $\mu$-split condition has been concluded, when considered instantaneously, a defect of at least one of the wheels is likewise established. The expression "relatively long period of time" is intended to mean that at least several braking operations over a distance of several kilometers are to be taken into consideration. To avoid incorrect conclusions, this period of time should extend over several trips on several days.

If, on one of the wheels, an impaired grip with the road surface attributable to the wheel is detected, this defect of the wheel is communicated to the vehicle driver, either by indicating the defect qualitatively, without the indication containing information on the magnitude of the defect, or by giving the vehicle driver a signal which provides information on the magnitude of the defect. In a simple embodiment, the strength of the signal increases in proportion to the magnitude of the defect. In a preferred embodiment, the strength of the signal increases progressively with the magnitude of the defect of the wheel. Thus, the vehicle driver is warned increasingly clearly when a dangerous state of the wheel is being reached.

In the process according to the current invention, when a μ-split condition is detected, braking behavior can be controlled in a manner comparable to the known method of attenuating yawing moment, by means of a time-delayed pressure build-up in an ABS. The ABS exerts control only when the threshold values specific to the system are reached.

Moreover, under some circumstances, it is expedient to influence the steering characteristic of the vehicle during the negotiation of a curve and a simultaneous braking operation. For this purpose, whether the steering movement is to be assisted or weakened by the distribution of the brake pressure depends on the natural dynamics of the vehicle. The state of the negotiation of a curve is detected in a known manner by a transverse-acceleration sensor and/or a sensor for detecting the steering-lock angle in conjunction with a driving-speed sensor. The distribution of the braking force can be determined from a stored family of characteristics of brake pressure as a function of one or more of the quantities of transverse acceleration, μ-value, vehicle speed and desired value for the braking force to be applied. In a braking operation, since the lateral guiding force of the wheels decreases with increasing braking force, in general the brake pressure is distributed in such a way that the steering movement of the vehicle is assisted increasingly with an increase of one or more of the quantities of transverse acceleration, vehicle speed and desired value for the braking force to be applied. A decrease of the μ-value causes the vehicle to "push on the wheels". At a decreasing μ, therefore, the brake pressure will be distributed in such a way that the steering movement of the vehicle driver is assisted in order to allow a better track-holding of the vehicle.

Other objects, advantages and novel features of the present invention will become apparent from the following detailed description of the invention when considered in conjunction with the accompanying drawings.

BRIEF DESCRIPTION OF THE DRAWINGS

FIG. 2(a) and 2(b) shows the trend of the wheel slip and braking force when the brake pressure is interrupted, in comparison with a continuously applied brake pressure, and FIG. 3 shows a family of characteristics representing the braking force coefficient μ plotted against the wheel slip σ as a function of different conditions of friction.

DETAILED DESCRIPTION OF THE DRAWINGS

Figure 1:
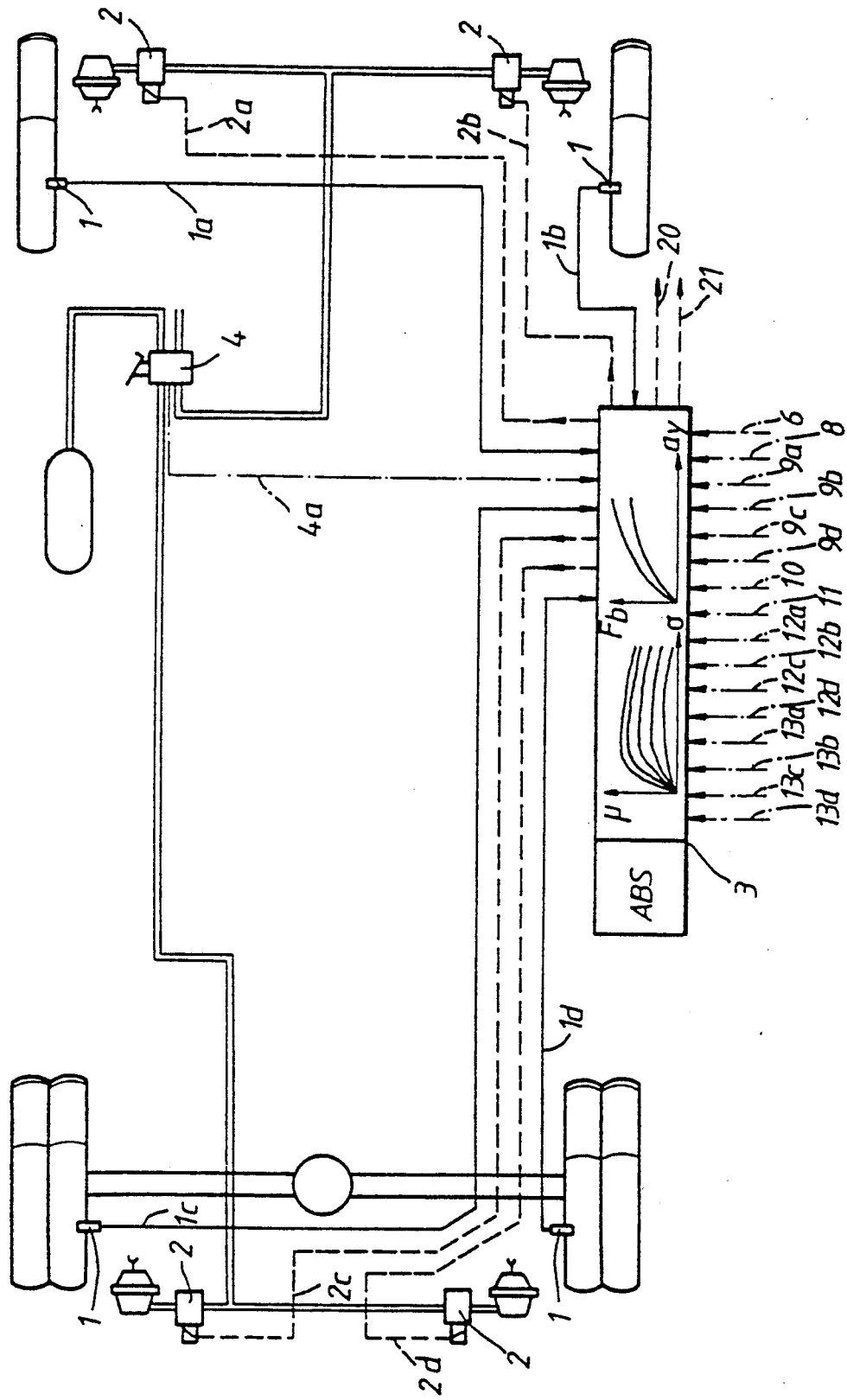
FIG. 1 shows an arrangement for determining the slip of the individual wheels of a vehicle during braking, and for deriving values obtained therefrom.

As is evident from FIG. 1, the speed signals 1a, 1b, 1c and 1d from the speed sensors 1 mounted on the individual wheels are received by the control device 3, and output signals 2a, 2b, 2c and 2d are sent to the pressure-reducing components 2. The setting signal 4a is received by the control device 3 from the brake-value transmitter 4, for the purpose of determining a desired value for the intensity of the braking operation. Furthermore, the control device 3 can also receive one or more of the following quantities:

signal 6 representing the steering-wheel angle signal 8 representing the transverse acceleration signal 9a representing gravitational load on the left front wheel signal 9b representing the gravitational load on the right front wheel signal 9c representing the gravitational load on the left rear wheel signal 9d representing the gravitational load on the right rear wheel signal 10 representing the total weight of the vehicle signal 11 representing the deceleration of the vehicle signal 12a representing the braking force on the left front wheel signal 12b representing the braking force on the right front wheel signal 12c representing the braking force on the left rear wheel signal 12d representing the braking force on the right rear wheel signal 13a representing the brake pressure on the left front wheel signal 13b representing the brake pressure on the right front wheel signal 13c representing the brake pressure on the left rear wheel signal 13d representing the brake pressure on the right rear wheel, Based on the above inputs, control device 3 determines wheel-slip values for each wheel, and output signals which are to be transmitted according to specific criteria to the pressure-reducing components 2 in order to achieve a desired braking behavior. It is possible to determine the transverse acceleration from the steering-wheel angle and from the vehicle speed determined from the speed signals 1a to 1d. Alternatively, this can be carried out by means of a transverse-acceleration sensor. From this it is possible to determine wheel slip on the individual wheels during the negotiation of a curve. The signals 9a-9d can be used, if the braking force $F_b$ is known individually for each wheel, to determine the associated braking force coefficient for the corresponding wheel. The braking force $F_b$ is determined, for example, on the brake caliper of the corresponding wheel by means of wire strain gauges. Alternatively, the brake pressure which acts on each wheel and which is proportional to the braking force in a close approximation can be measured. Moreover, it is possible to determine the resultant braking force $F_B$ from the total weight of the vehicle and the vehicle deceleration. This braking force can then be distributed uniformly to all the wheels.

When ABS is present, its activating signals sent to the pressure-reducing components 2 take precedence over the output signals 2a-2d of the control device. The activating signals of an ABS are preferably transmitted to the same pressure-reducing components.

Furthermore, a combination of these quantities can be used as described above to make statements on a possible μ-split condition caused by a differing grip between the wheels and the road surface on the different sides of the vehicle. If such a μ-split condition occurs, the vehicle driver is given appropriate information by means of a signal 20. Another evaluation of the combination of these quantities can show that the wheels have different states. When these different states are detected, information is sent to the vehicle driver by means of a signal 21. Furthermore, a family of μ/σ-characteristics and a family of $F_b/a_y$ characteristics are stored in the control device 3, the purpose of the latter being to make it possible to generate output signals which lead to a different adhesion utilization during the negotiation of a curve. The higher braking force is set on the inside of the curve when the vehicle is to be pulled into the curve during braking. Cornering is detected by means of the transverse acceleration $a_y$. In principle, this characteristic is also influenced by further factors.

FIG. 2 shows that the temporary interruption of the brake pressure results in a braking force according to the curve 30b. This trend of the braking force corresponds to the trend of the uninterrupted braking force according to curve 31b. The height of the maximum values of the curves is selected so that the areas under the two curves is equal, and the same braking force is applied. The braking force set according to curves 30b and 31b leads to a time trend of the wheel slip according to curves 30a and 31a respectively. The maximum value of the curve 30a corresponds to the wheel slip 0%, that is to say the speed of the free-running wheel. At the same time, the minimum value of the wheel slip of 10% corresponds to the wheel slip occurring at the maximum value of the applied braking force 30b. The curve 31a corresponds to the wheel slip occurring when the braking force is applied continuously according to curve 31b.

In FIG. 3, a family of characteristics for the braking force coefficient $\mu$ against the wheel slip $\sigma$ is plotted as a function of the grip between the wheel and the road surface. The braking force coefficient $\mu$ corresponds to the contribution $F_b$ of a wheel to the total braking force $F_B$, divided by the force obtained from the bearing weight $N_g$ of the vehicle on this wheel. It is thus possible to determine the grip between the wheel and the road surface from the two basically known values $\mu$ and $\sigma$.

A practical example of determining the wheel slip is as follows. When a braking operation is initiated, it is ascertained from the desired value predetermined by the brake-value transmitter 4 whether the vehicle is in the stable braking range shown in FIG. 3. If the vehicle is in this stable braking range, intermittent interruption of the brake pressure is initiated. Preferably brake pressure is removed simultaneously from all wheels on a particular axle in order to exclude the possibility of yawing reactions of the vehicle. The slip is determined for each wheel from the wheel speeds with braking force applied and from wheel speeds without braking force applied. By means of these wheel-slip values, the grip between the corresponding wheel and the road surface is determined from the braking force Fb found for each wheel. If it has been found that the wheels have different grips on different sides of the vehicle, it is concluded that there is a $\mu$-split condition. This is then indicated to the vehicle driver. The detection of this $\mu$-split condition leads to an adhesion utilization in a manner comparable to the attenuation of the yawing moment by means of a time-delayed pressure build-up in an ABS. Brake pressure is then controlled in such a way as to establish on the vehicle side with the better grip a wheel slip which leads to a balanced adhesion utilization on this side of the vehicle in relation to the other side of the vehicle. These differences in adhesion utilization are built up with such a time delay that sufficient time remains for the vehicle driver to compensate any yawing reaction of the vehicle which may possibly occur.

Although the invention has been described and illustrated in detail, it is to be clearly understood that the same is by way of illustration and example, and is not to be taken by way of limitation. The spirit and scope of the present invention are to be limited only the terms of the appended claims.

What is claimed:

1. Process for determining wheel slip $\sigma$ of at least one wheel of a vehicle, said at least one wheel having injective characteristics of braking force coefficient $\mu$ versus wheel slip $\sigma$ which each have a maximum and which vary as a function of the grip between said at least one wheel and the road surface, said process comprising the steps of:

detecting brake application;

generating at least an activating signal in response to said brake application when said vehicle is in a stable braking range;

intermittently removing and reapplying braking force with respect to said at least one wheel during generation of said activating signal, by means of at least one pressure reducing component associated therewith, whereby wheel speed of said at least one wheel during removal of braking force substantially equals that of a corresponding free running wheel;

measuring wheel speed of said at least one wheel with braking force applied, during generation of said activating signal;

measuring wheel speed of the same said at least one wheel with braking force removed, during generation of said activating signal; and comparing said wheel speed of said at least one wheel with braking fore applied, with the wheel speed of the same said at least one wheel with braking force removed.

2. Process according to claim 1, wherein said stable braking range is detected by at least one of: comparing a wheel deceleration derived from measured wheel speeds with braking force applied, with at least one wheel-deceleration threshold, and by sending activating signals of an anti-lock system to the pressure-reducing component.

3. Process according to claim 1, wherein time intervals between successive removals of said brake pressure during a braking operation are varied.

4. Process according to claim 1, wherein said first measuring step, said step of intermittently removing, said second measuring step and said comparing step are performed separately with respect to at least one wheel on each side of said vehicle, and wherein both wheel slip $\sigma$ and braking force coefficient $\mu$ are determined from a braking force and a gravitational force measured on each wheel, and corresponding $\mu/\sigma$-characteristic of the family of characteristics are determined from this pair of values.

5. Process according to claim 4, wherein different states of individual wheels of the vehicle are detected form the existence of different $\mu/\sigma$-characteristics determined by averaging over a relatively long period of time.

6. Process according to claim 4, wherein a $\mu$-split condition is detected based on the existence of different $\mu/\sigma$- characteristics on different side of the vehicle.

7. Process according to claim 1, wherein said first measuring step, said step of intermittently removing, said second measuring step and said comparing step are performed separately with respect to at least one wheel on each side of said vehicle, and wherein, the brake pressure on the wheels is controlled in response to the measured values of the wheel slip $\sigma$ of individual wheels to establish a wheel slip which leads to preselected characteristic of adhesion unitization for each of said wheels.

8. Process according to claim 1, wherein said first measuring step, said step of intermittently removing, said second measuring step and said comparing step are performed separately with respect to at least one wheel on each side of said vehicle, and wherein, brake pressure on the wheels is controlled in response to the measured values of wheel slip $\sigma$ of the individual wheels, to establish on the individual wheels a wheel slip which leads to a preselected steering characteristic for said wheels during detected cornering.

9. Process according to claim 8, wherein a specific steering characteristic is established from a family of characteristics in which are stored values for a distribution of the brake pressure as a function of one or more of the parameters of transverse acceleration, $\mu$-value, vehicle speed and desired value for the braking force to be applied.

10. Process according to claim 1, wherein said first measuring step, said step of intermittently removing, said second measuring step and said comparing step are performed separately with respect to at least one wheel on each side of said vehicle, and wherein brake pressure on the wheels is controlled in response to the measured values of the wheel slip $\sigma$ of individual wheels, to establish on the individual wheels a wheel slip which leads to a uniform wear of the brake linings.

11. Process according to claim 1, wherein said step of detecting brake application comprises determining a described brake pressure value from a position of a brake value transmitter of said vehicle, and wherein the time averaged value of the braking force applied and intermittently removed during generation of said activating signal is substantially equal to a continuously applied braking force based on said desired brake pressure value.

12. Process according to claim 11, wherein said stable braking range is detected by comparing the desired brake-pressure value with at least one predetermined threshold value.

13. Process according to claim 11, wherein said stable braking range is detected by at least one of: comparing a wheel deceleration derived from measured wheel speeds with braking force applied, with at least one wheel-deceleration threshold, and by sending activating signals of an anti-lock system to the pressure-reducing components.

14. Process according to claim 11, wherein said first measuring step, said step of intermittently removing, said second measuring step and said comparing step are performed separately with respect to at least one wheel on each side of said vehicle, and wherein both wheel slip $\sigma$ and braking force coefficient $\mu$ are determined from a braking force and a gravitational force measured on each wheel, and corresponding $\mu/\sigma$-characteristic of the family of characteristics are determined from this pair of values.

15. Process according to claim 14, wherein brake pressure on the wheels is controlled in response to the measured values of the wheel slip of $\sigma$ of individual wheels, to establish on the individual wheels a wheel slip which leads to a preselected steering characteristic for said wheels during detected cornering.

16. Process according to claim 14, wherein brake pressure on the wheels is controlled in response to the measured values of the wheel slip $\sigma$ individual wheels, to establish on the individual wheels a wheel slip which leads to a uniform wear of the brake linings.

17. In a braking arrangement for a vehicle having at least one rotatable supporting wheel, a device for measuring wheel slip comprising:
 means for intermittently removing and reapplying braking force with respect to said rotatable wheel during a braking application when said vehicle is in a stable braking range;
 means for measuring speed of said rotatable wheel with braking force applied;
 means for measuring speed of said rotatable wheel without braking force applied; and
 means for comparing the measured speed of said wheel with braking force applied and without braking force applied.

18. The apparatus according to claim 14, in which said vehicle has a multiplicity of said rotatable supporting wheels, each of said rotatable supporting wheels having associated therewith separate means for measuring its speed with braking force applied and separate means for measuring its speed without braking force applied, thereby enabling precise determination of wheel slip at each wheel independently of the others.

19. Process for measuring the wheel slip of individual wheels of a vehicle during the application of braking force to one or more of said wheels, comprising the steps of
 a. separately measuring the speed of each of said braked wheels with braking force applied thereto;
 b. interrupting the application of braking force to each of said braked wheels;
 c. separately measuring the speed of each of said braked wheels during the interruption of braking force thereto;
 d. comparing separately with respect to each of said braked wheels, the measured speed thereof with braking force applied and with braking force interrupted.

20. In a braking arrangement for a vehicle having at least one rotatable supporting wheel, a device comprising:
 braking means for applying braking force to each wheel of said vehicle;
 interrupting means for intermittently interrupting the braking force applied to each of said wheels;
 measuring means for measuring separately for each wheel the speed of said wheel with braking force applied and with braking force interrupted; and
 means for comparing, separately for each wheel, the measured speed of said wheel with braking force applied and with braking force interrupted; thereby enabling precise determination of wheel slip at each wheel, independently of the others.

21. The apparatus according to claim 20, which said interrupting means further comprises:
 means for varying the time intervals between interruptions of the braking force during a braking operation.

22. The apparatus according to claim 20, further comprising:
 means for determining a desired braking force value;
 means for measuring an effective time average braking force value applied by said braking means during application of braking force and intermittent interruption thereof by said interrupting means; and means for adjusting the braking force applied by said braking means to a value at which the effective time average braking force value equals the desired braking force value.

23. Apparatus according to claim 20, in which said measuring means further comprises:

means for measuring rotational acceleration and rotational deceleration of each of said wheels; and means for causing measurement of speed of each of said wheels to be made when one of said rotational acceleration and said rotational deceleration thereof falls below a predetermined threshold level.

24. The apparatus according to claim 20, in which said measuring means further comprises means for causing the measurements of the speed of said wheels to be made at a predetermined interval following each intermittent interruption and reapplication of braking force.

25. The apparatus according to claim 20, which further comprises:

means for measuring the gravitational force acting on each wheel of said vehicle:

means for measuring the braking force exerted by each wheel of the vehicle; and means for comparing said gravitational force with said braking force to determine a braking force coefficient separately for each wheel of said vehicle.

26. The apparatus according to claim 25, which further comprises:

means for comparing the braking force coefficient and wheel slip values determined for each wheel of said vehicle, thereby enabling a determination of the grip of each said wheel with the road surface.

27. The apparatus according to claim 25, which further comprises:

means for detecting differences in grip of the road surface as between at least one wheel of said vehicle.

* * * * *